Feb. 7, 1967   C. G. P. OLDERSHAW   3,302,677
SLICING MACHINE
Filed Jan. 2, 1964   2 Sheets-Sheet 1

INVENTOR.
CHARLES G. P. OLDERSHAW
BY
C. German Hubbard
ATTORNEY

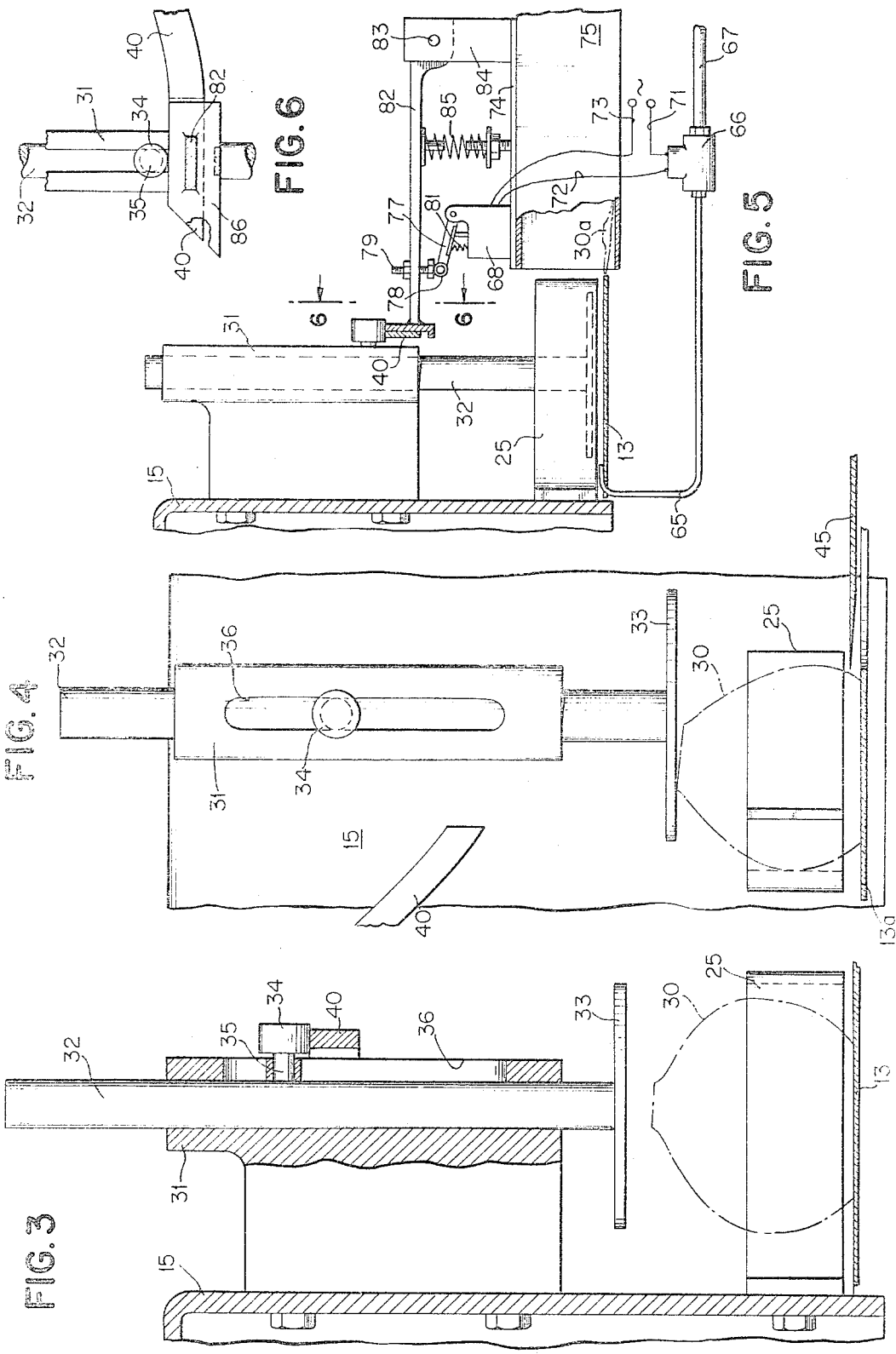

United States Patent Office 3,302,677
Patented Feb. 7, 1967

3,302,677
SLICING MACHINE
Charles G. P. Oldershaw, Avon, N.Y., assignor to General Foods Corporation, White Plains, N.Y., a corporation of Delaware
Filed Jan. 2, 1964, Ser. No. 335,084
12 Claims. (Cl. 146—105)

This invention relates generally to cutting mechanisms and has particular reference to machines for effecting successive slicing of an object so as to produce slices thereof of uniform thickness both between the several slices and otver the entire area of each slice.

The invention is shown in an embodiment adapted for slicing onions so as to produce onion rings suitable for further processing such as, for example, French frying. In the production of onion rings for this purpose it is important that each of the rings produced be of uniform width, the width of the ring corresponding to the thickness of the slice, and that the edges of the individual rings be not damaged during the slicing process. It is also important that the maximum number of usable rings be obtained from each onion.

Heretofore it has been the practice in the onion slicing art to manually slice off the root end of the onion and the stem end of the onion along planes which define the usable portion of the onion. Since onions vary in size and contour, this initial trimming step has not been readily adaptable for machine operation and has customarily been performed by hand. It will readily be apparent that such a trimming operation, when performed by hand, even in the case of highly skilled workers, produces a trimmed onion in which the planes of the two trimming cuts are usually not parallel to each other. As a result, there has usually been produced by the heretofore practiced process, at least one slice from each onion which is nonuniform in thickness, i.e., wedge shaped, which results in several of the rings produced from each onion being of nonuniform width. In the interest of uniformity of ring width, the nonuniform rings could be rejected but this would involve the use of highly complicated and expensive equipment if done other than manually, and moreover, would be highly uneconomical since it would mean that a considerable portion of the usable part of the onion would be lost.

The apparatus according to the instant invention does not require that the preparatory trimming operation be accomplished by slices at the root and stem end which are precisely parallel to one another. In trimming the onion for use with the instant apparatus, one of the trimming cuts, preferably the trimming of the root end, is made at the point which separates the root end from the usable portion of the onion. The trimming cut at the stem end is made at a point somewhat outside of the point dividing the usable portion of the onion from the unusable portion. When thus prepared, the onion is placed with its trimmed root end face down on the surface of a horizontal support plate and within the confines of a conveyor pocket which continually rotates to carry the onion around the said surface and past a cutting blade which is disposed in the path of onion travel.

Each onion while traversing the major portion of said circular travel or orbit rests freely on said supporting surface without any pressure applied thereto so as to minimize any damage or abrasion to the bearing surface of the onion from the resulting frictional contact. At the point where each onion approaches the cutting blade a hold down member becomes effective for retaining the onion in firm contact with the cutting blade so as to assure that each slice is made in a parallel plane relative to that of the preceding slice, thereby assuring uniformity in the thickness of the several slices. After the final slice has been made through the usable portion of the onion, novel eject mechanism operates to automatically remove the remaining unusable portion of the onion from the confines of its pocket, thereby enabling insertion of another pretrimmed onion within the pocket for continuing the slicing process. In this manner, all of the usable portion of the onion is retained, and all of the unusable portion of the onion is rejected.

It is, therefore, an object of this invention to improve upon means for effecting successive cuts in an article or object to produce slices of uniform thickness.

It is a further object of this invention to obtain the maximum number of slices of uniform thickness from the usable portion of the article being sliced.

It is a further object of this invention to provide an improved mechanism for slicing abradable objects which avoids injury to the object during the slicing process.

It is a still further object of this invention to provide means for automatically ejecting the unusable portion of the object being sliced and indicating same to an operator after the final slice has been made in the usable portion thereof.

Further objects of the invention together with the feautres contributing thereto and the advantages resulting therefrom will be apparent from the following description when read in conjunction with the drawing wherein:

FIG. 3 is a detailed view in side elevation of the hold down mechanism in its raised inoperative position.

FIG. 4 is a detailed view in side elevation of the hold down mechanism in its released operative position during the approach of an onion to the cutting blade.

FIG. 5 is a view in side elevation in detail of the means and control thereof for automatically ejecting the unusable portion of the onion.

FIG. 6 is a detailed sectional view taken along the lines 6—6 of FIG. 5.

Figure 1:
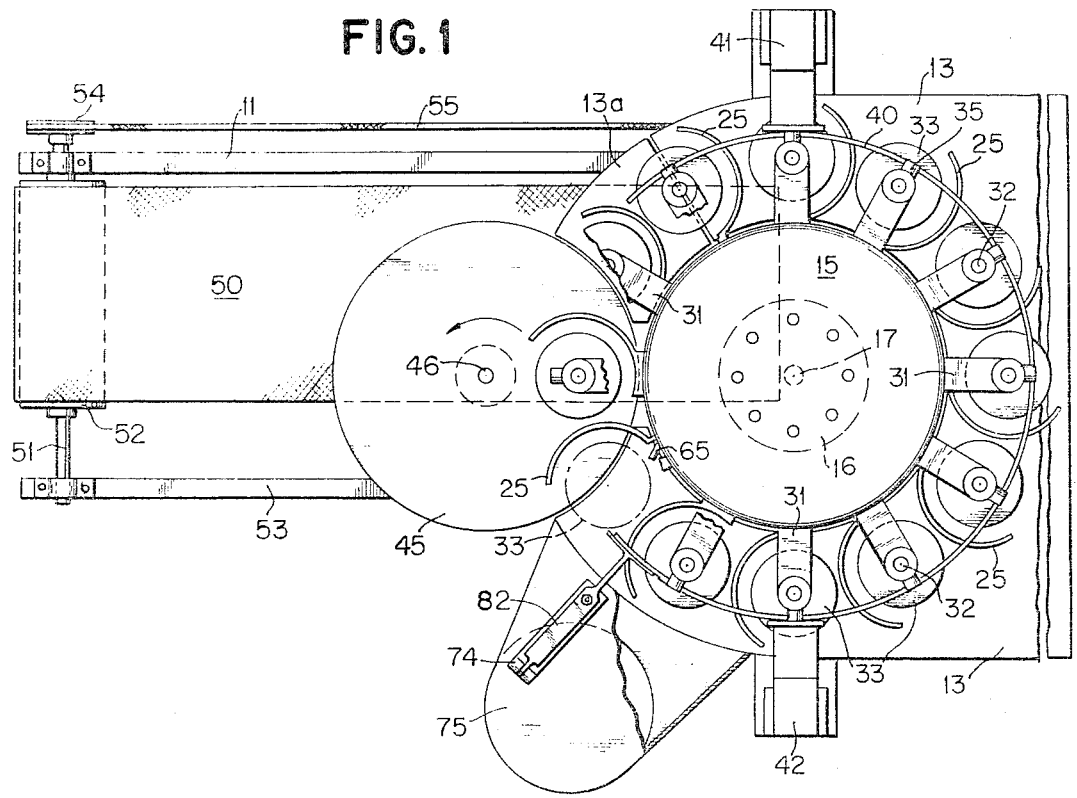
FIG. 1 is a plan view of the machine.
Figure 2:
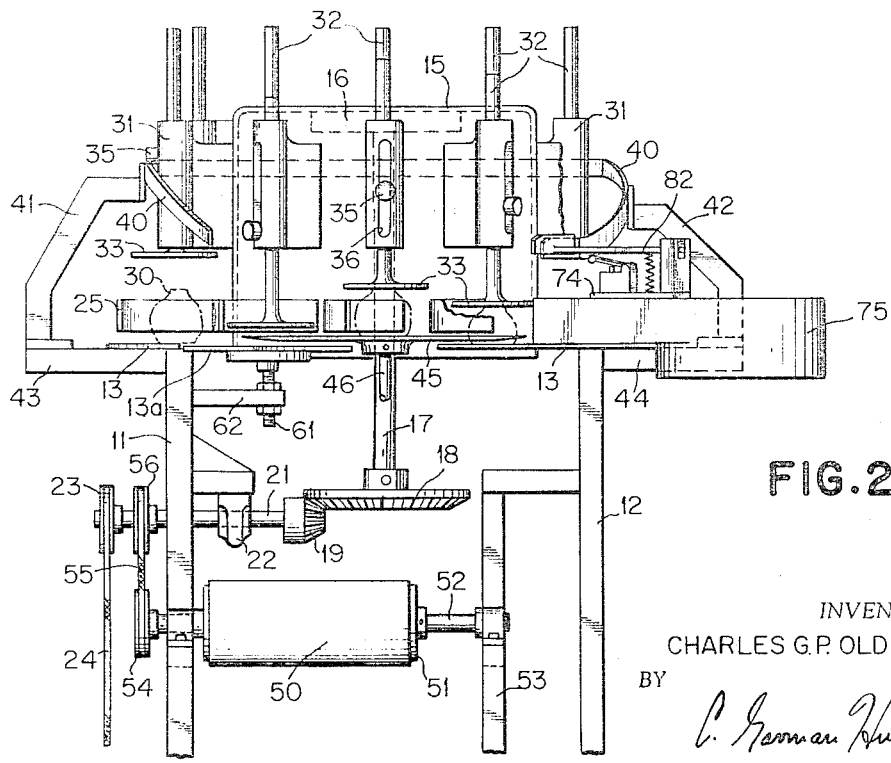
FIG. 2 is a side elevation of the mechanism shown in FIG. 1.

With reference now to FIGS. 1 and 2, it will be seen that the machine is supported by framework including upright plates 11, 12, the upper ends of which support a horizontally disposed bed plate 13. One end of the bed plate 13 is arcuately shaped to define segments of a semicircle, and the center portion of said plate is cut away as best seen in FIG. 1 to accommodate a dome shaped turret member 15 which is concentric with the arcuate end segments of the bed plate 13.

The turret member 15 is secured to a disc 16 supported at the upper end of a vertical shaft 17. Said shaft 17 is suitably journaled in the framework and carries at its lower end a bevelled gear 18 meshing with a bevelled gear 19 carried by a horizontal shaft 21. Shaft 21 is journaled in a bearing 22 suitably supported on the frame plate 11 and carries at its outer end a pulley 23 around which is wrapped a drive belt 24. The drive belt runs to a motor driven pulley, not shown, by which through the train of mechanism just described the turret member 15 is caused to continuously rotate about the vertical axis defined by the shaft 17.

Secured about the periphery of the turret 15, at equally spaced increments, are a plurality of horizontally disposed arcuate retaining fingers 25 which define a series of individual open sided pockets adapted to receive an onion 30 and convey it in an orbital path over the surface of the bed plate 13. The bottom edge of the fingers 25 is spaced slightly above the surface of the bed plate 13.

Also secured to the turret member 15 at equally spaced increments about its periphery are a plurality of vertically extending sleeves 31 in each of which is slidably fitted a shaft 32. The lower end of each shaft carries a disc 33 and near its mid-point each shaft carries a roller 34 mounted on a stud 35, see FIG. 3, said stud riding in a vertical slot 36 formed in the sleeve 31. The construction is such that the shaft 32 and disc 33 are supported in vertical alignment with the central area of an associated pocket defined by the retaining fingers 25, the shaft being freely slidable under its own weight, by gravitational forces, within the sleeve 31 and adapted when at the cutting zone to bear downwardly upon an onion so as to hold it in firm contact with the cutting means hereinafter to be described.

The elevation of the hold down discs is controlled over the major portion of the cycle, i.e., other than when traversing the cutting zone, by a cam rail 40 which is concentric with turret 15 and is disposed so as to engage with the rollers 34. The cam rail is supported on one side of the machine by a bracket 41 and at the opposite side by a bracket 42, which brackets are in turn secured to horizontal extensions 43, 44 of the vertical frame plates 11, 12 respectively. The cam rail is discontinuous, i.e., does not extend over the cutting zone, and over the major portion of its length the cam rail serves to maintain the hold down discs in their most elevated position in which they lie in spaced relation above an onion contained in the associated pocket of turret 15. The portion of the cam rail 40 at its end on the approach side to the cutting zone slopes downwardly so as to lower the hold down disc 33 into bearing contact with whatever remaining portion of an onion may be confined within the associated pocket. The end portion of the cam rail 40 at the discharge side of the cutting zone has a short horizontal section and then slopes upwardly so as to elevate the hold down discs 33 and remove the pressure thereof from the associated onion as it is conveyed over the surface of the bed plate 13.

Disposed at the cutting zone is a circular blade 45 mounted on the upper end of a vertical shaft 46 driven in a suitable manner by a motor, not shown, and which may be the same as or separate from the motor for driving the turret 15. A segment of the cutting blade 45 intersects the orbital path of the onions 30 and lies in a plane slightly above that of the bed plate 13, so that as each onion is carried through the cutting zone a slice is removed from the bottom side thereof, said slice dropping onto a conveyor belt 50, it being understood that the bed plate 13 is cut away at the cutting zone so as not to underlie the blade 45 or in any way interfere with the dropping of the slices onto the belt 50.

The conveyor belt 50 reaches about a wide pulley or drum 51 mounted on a shaft 52 suitably journaled in the vertical frame plate 11 and an auxiliary frame plate 53. On one end of the shaft 52 is a pulley 54 around which runs a belt 55 which extends to a pulley 56 carried by the aforementioned shaft 21, thus providing means for driving the pulley 51 from the same power source which drives the turret 15. The belt 50 at its opposite end runs around a similar pulley or drum, not shown, and serves to convey the slices removed from the onion by the rotary cutting blade 45 to a location for further processing thereof.

In order to provide adjustability in the thickness of the slices taken off the onion by the cutting blade 45, the bed plate 13 is formed with a separate adjustable segment 13a at the approach to the cutting zone. Said separate segment 13a is mounted on a threaded stud or bolt 61 threaded into a horizontal extension 62 of the vertical frame plate 11, whereby the elevation of the segment 13a may be precisely adjusted with the adjustment being maintained by suitable locking nuts cooperating with said bolt 61.

After the last slice has been taken through the usable portion of the onion 30, the remaining unusable portion is automatically ejected from the pocket by means now to be described. As best seen in FIG. 5, an air conduit 65 is disposed with its discharge end overlying the bed plate 13 at the exit side of the cutting zone, the end of said conduit being directed towards the open side of the pockets defined by the retaining fingers 25. Said conduit 65 runs to a solenoid controlled valve 66 which is connected by another conduit 67 to a source of compressed air or the like, not shown. Said valve is in a series circuit with a microswitch 68, the circuit being completed to a suitable source by conductors 71, 72 and 73. The microswitch 68 is mounted on a support plate 74 secured to the top of an eject hood or chamber 75 which has an open end facing the discharge end of the conduit 65 and having a circular discharge opening in the bottom thereof below which may be placed a receptacle, not shown, for receiving the rejected unusable portion 30a of the onion after the last slice has been cut away therefrom. The microswitch 68 includes an actuating arm 77 pivoted thereto and carrying a roller 78 adapted to bear on the head of a bolt 79 under the bias of an adjustably tensioned compression spring 81. The bolt 79 is threaded into a support arm 82 pivoted at 83 to an upright post 84 secured to the plate 74, said arm 82 being biased in a clockwise direction by an adjustably tensionable spring 85. The inner end of the arm 82 carries a horizontally disposed bar 86 extending along and concentric with the horizontally disposed end section of cam rail 40, the lower edge of the bar 86 being turned inwardly to define a flange serving as a limit for the upward or clockwise rotation of the support arm 82. Both the bar 86 and adjacent section of the rail 40 are adapted to be engaged by a roller 35 when at the level it assumes after the last slice of the usable portion of the onion has been removed leaving only the unusable portion 30a. It of course will be understood that on each pass of an onion through the cutting zone one slice of the onion is removed, whereupon the hold down disc momentarily drops an extent corresponding to the thickness of the slice, so that after all slices of the usable portion of the onion are removed the hold down disc will be in the position indicated in FIG. 5. As the disc leaves the cutting zone, the roller 35 engages the end portion of the fixed cam rail 40 simultaneously with, or substantially so, engagement with the depressable bar 86. The elevation of the fixed rail 40 at this stage is such that it slightly raises the hold down disc off the unusable portion 30a of the onion. As the bar 86 is depressed by the roller 35 due to the weight of the disc and shaft assembly, the microswitch actuating arm 77 is rocked to actuate the microswitch 68 thereby completing an electrical circuit to actuate the solenoid control valve 66. Actuation of the valve enables compressed gas to flow through conduit 65 and be discharged through the open end thereof in a jet or blast which blows the unusable portion 30a of the onion off the bed plate and into the reject chamber 75 from where it falls into a suitable receptacle, not shown, as above described. As can best be seen in FIG. 6, the receiving edge of both the bar 86 and the fixed rail 40 is gently inclined so as to serve as a camming surface enabling smooth transfer of a roller 35 from the cutting zone onto the upper horizontal surfaces of the rail 40 and bar 86, respectively.

FIGS. 3 and 4 are views of the hold down means taken at different positions around the onion conveying orbit but within the same pass or operating cycle of the conveying turret 15. FIG. 3 can be considered taken at any one of several points around the orbit relatively remote from the cutting zone, and, for example, could be a point diametrically opposed from the cutting zone. It will be noted that at this point the hold down disc 15 is maintained in its most elevated position by the cam rail 40 so as not to bear on the onion and apply pressure to the surface contact of the onion with the bed plate 13, which would tend to abrade or injure the cut surface of the onion. When in this position, any empty pocket which may be observed by an operator as a result of the unusable portion being automatically ejected, as heretofore described, is in condition for receiving another onion, the elevated hold down disc providing access for enabling insertion of an onion in an empty pocket. The sound made by the air blast provides an audible signal to alert the operator, positioned across the turret from the cutting zone, and indicates that an empty pocket is approaching. FIG. 4 shows the same onion at the approach to the cutting zone and after the associated hold down mechanism has left the stationary cam rail 40. It will be noted that the onion 3 depicted in FIGS. 3 and 4 has been cut off at the stem end along a plane which is not quite parallel with the cut made through its root end. However, this diversion of the two cutting planes will not affect the uniformity in thickness of the slices removed from the usable portion of the onion, since the machine enables the cut through the stem portion to be made entirely within the unusable portion of the onion which is automatically ejected as heretofore described.

The thickness of the unusable portion to be ejected may be predetermined by means of the adjustability feature of the mechanism as best seen in FIG. 5. This adjustability is provided by the bolt 79 which bears upon the actuating arm for the microswitch 68 and may be adjusted in elevation relative to the support arm 82 to thereby determine whether or not the switch would be actuated at a particular elevation of the hold down disc 33 which, of course, is determined by the thickness of the portion of the onion remaining after a slice has been removed therefrom.

While there has been shown and described what is considered to be a preferred embodiment of the invention, it will of course be obvious that changes in form can be made without departing from the spirit of the invention. It is, therefore, intended that the invention not be limited to the exact form herein shown and described nor to anything less than the whole of the invention herein disclosed and as hereinafter claimed.

What I claim and desire to secure by Letters Patent is:

1. In an apparatus for removing successive slices from a substantially spheroidal object, a bed plate providing a flat supporting surface for said objects, means for conveying said objects in an orbital path over said surface, cutting means disposed in a plane parallel to that of said surface and in a zone at which it intersects the orbital path of said objects to remove a slice from each object when passing through said cutting zone, and intermittently operable hold down means carried by said conveying means and effective to bear against the top of said objects only when passing through said cutting zone for holding the associated object in firm engagement with the said cutting means.

2. The invention according to claim 1 wherein said conveying means comprises a turret member rotating about an axis perpendicular to the surface of said bed plate and provided with a plurality of arcuate shaped retaining fingers projecting outwardly to define a series of open-sided pockets each accommodating one of said objects.

3. The invention according to claim 1 wherein said cutting means comprises a circular blade rotating about an axis perpendicular to the surface of said bed plate.

4. The invention according to claim 1 wherein said hold down means includes a slidable member supported in register with each of said pockets and biased for movement towards said associated pocket, and including fixed camming means for releasoing said hold down means when traversing said cutting zone and for positively disabling said hold down means when traversing the remainder of said orbital path.

5. The invention according to claim 1 wherein said bed plate includes a separate section disposed at the approach to said cutting zone and adjustably mounted to enable variation in the spacing between the supporting surface thereof and the plane of said cutting means.

6. In an apparatus for removing successive slices from a substantially spheroidal object, a bed plate providing a flat supporting surface for said objects, a turret member rotatable about an axis perpendicular to said supporting surface for conveying said objects in an orbital path over said surface, said turret member being provided with arcuate outwardly extending retaining fingers defining a series of open-sided pockets for accommodating said objects, a rotary cutting blade disposed in a plane parallel to that of said surface and in a zone at which it intersects the orbital path of said objects to remove a slice from each object when passing through said cutting zone, a hold down member carried by said turret member in register with each of said pockets and mounted for sliding movement along an axis intersecting the object contained in an associated pocket, each said hold down member being biased for movement in the direction towards a said pocket, and a fixed camming member shaped to release said hold down members for pressure engagement with the object in an associated pocket when traversing said cutting zone and for disabling said hold down members by removing the pressure thereof from an associated object when traversing the remaining portion of said orbital path.

7. In an apparatus for removing successive slices from a substantially spheroidal object pretrimmed at one end to remove an unusable portion thereof and at the other opposite end to leave intact an unusable portion thereof, a bed plate providing a flat supporting surface for said objects, means shaped to define a series of open-sided pockets for conveying said objects in an orbital path over said surface with the pretrimmed cut exposing a usable portion of the object in bearing contact with said supporting surface, cutting means disposed in a plane parallel to that of said surface and in a zone at which it intersects the orbital path of said objects to remove a slice from each object when passing through said cutting zone, hold down means carried by said conveying means and effective when passing through said cutting zone for holding the associated object in firm engagement with said cutting means, and means effective after the last usable slice has been removed from said object by said cutting means for ejecting the remaining unusable portion of said object from said conveying means.

8. The invention according to claim 7 wherein the operation of said ejecting means provides an audible signal indicating the empty condition of the associated pocket.

9. The invention according to claim 7 wherein said ejecting means includes a conduit connected to a supply of compressed gas and having an orifice disposed at the exit side of said cutting zone and directed to discharge said gas through a said pocket and towards the open-side thereof to carry away said unusable portion of said object.

10. The invention according to claim 7 including mechanism activated by said hold down means upon leaving said cutting zone and when in a position indicating that the last slice has been removed from the usable portion of said object for operating said ejecting means.

11. The invention according to claim 10 wherein said mechanism includes a spring-biased bar disposed adjacent and coextensive with a section of said fixed cam means for actuation by said hold down member, a switch activated by the actuation of said bar, and a solenoid controlled valve in said conduit for releasing said compressed gas upon activation of said switch.

12. The invention according to claim 11 including means for adjusting the amount of actuation of said bar required to activate said switch for determining the corresponding amount of the unusable portion of said object to be carried away by operation of said ejecting means.

References Cited by the Examiner

UNITED STATES PATENTS

| | | |
|---|---|---|
| 446,510 | 2/1891 | Cummings. |
| 1,235,226 | 7/1917 | Minnemann _____ 83—411 |
| 2,193,979 | 3/1940 | Ott. |
| 2,617,454 | 11/1952 | Booth _____ 143—57 X |
| 2,727,542 | 12/1955 | Fischer _____ 144—176 |
| 2,917,093 | 12/1959 | Henry _____ 146—165 |

FOREIGN PATENTS

| | | |
|---|---|---|
| 873,145 | 7/1961 | Great Britain. |
| 160,041 | 8/1957 | Sweden. |

ANDREW R. JUHASZ, *Primary Examiner.*

WILLIE G. ABERCROMBIE, *Examiner.*